United States Patent [19]

Einhorn et al.

[11] 4,110,907

[45] Sep. 5, 1978

[54] GLASS CUTTER

[75] Inventors: Ruediger Einhorn, Katonah; Lee Richard Chasen, Port Chester; Joseph Walter Blake, III, South Salem, all of N.Y.

[73] Assignee: Coats & Clark, Inc., Stamford, Conn.

[21] Appl. No.: 776,602

[22] Filed: Mar. 11, 1977

[51] Int. Cl.² .................... C03B 33/10; B26B 25/00
[52] U.S. Cl. ................................. 30/164.95; 33/32 C; 225/96
[58] Field of Search .................... 30/123.3, 164.95; 83/12; 33/32 B, 32 C; 225/96

[56] References Cited
U.S. PATENT DOCUMENTS

| | | | |
|---|---|---|---|
| 1,731,257 | 10/1929 | Moller | 30/164.95 |
| 2,516,668 | 7/1950 | Barrett | 30/164.95 |
| 2,750,674 | 6/1956 | Lee | 33/32 C |

*Primary Examiner*—Jimmy C. Peters
*Attorney, Agent, or Firm*—Burgess, Ryan and Wayne

[57] ABSTRACT

A glass cutter having a cutting wheel rotatably mounted at one end thereof. A cutting fluid reservoir is situated within the tool housing at the end remote from the cutting wheel. The cutting wheel is mounted on a support member which is spring biased to provide a constant cutting pressure. A part of the wheel supporting member cooperates with the interior of the housing to form a valve which allows cutting fluid to flow through the wheel when the wheel is displaced against the action of the spring toward the housing during a cutting operation. A wheel cover pivotably mounted to the housing adjacent the cutting wheel has a closed position in which it protects the cutting wheel, and an open position in which the cover acts as a cutting guide.

23 Claims, 9 Drawing Figures

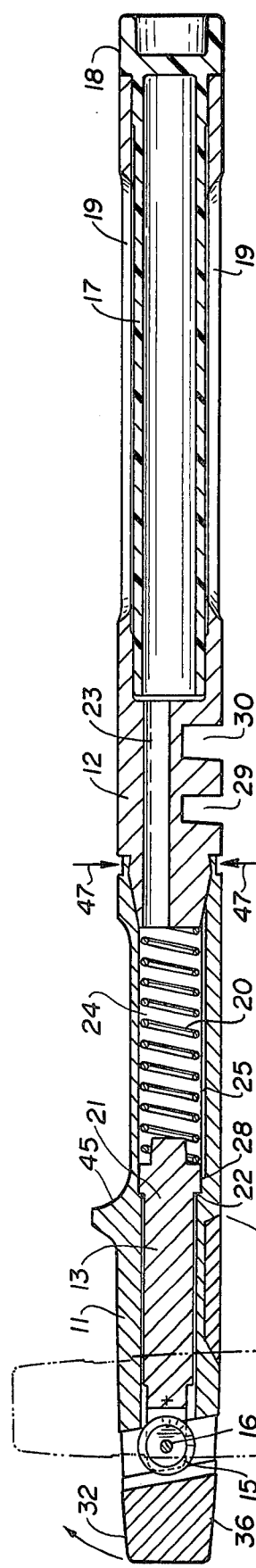
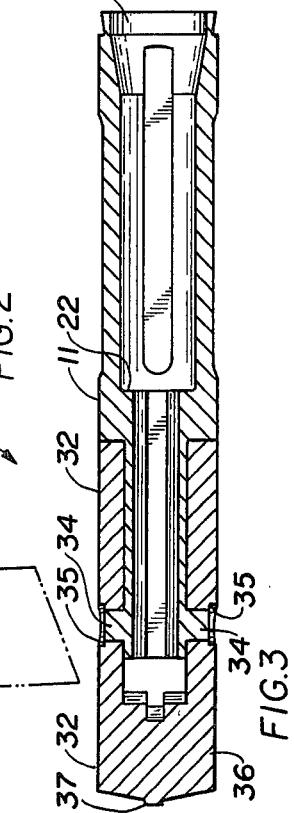
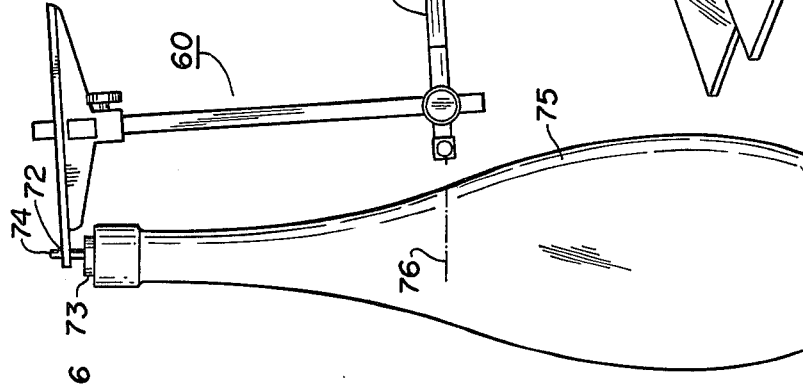
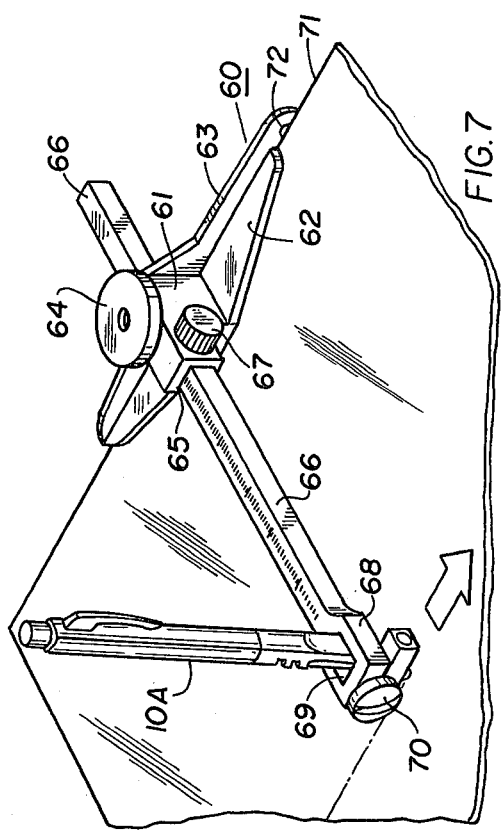
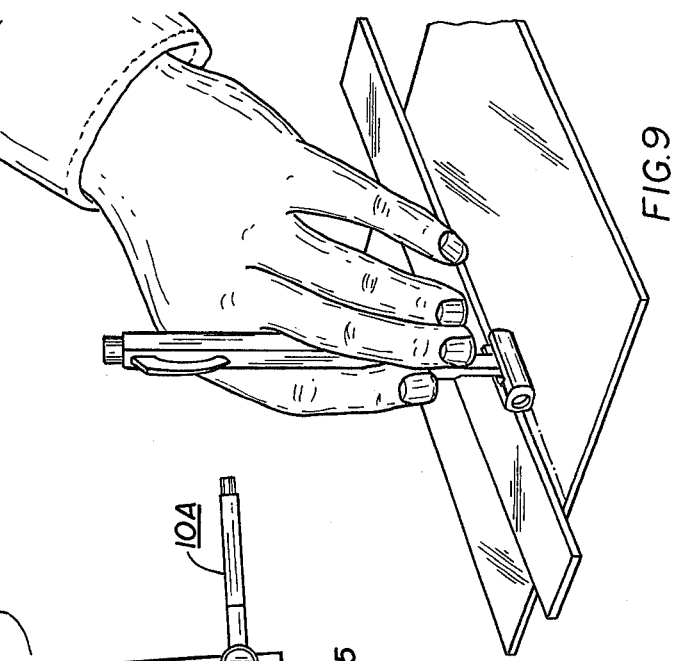

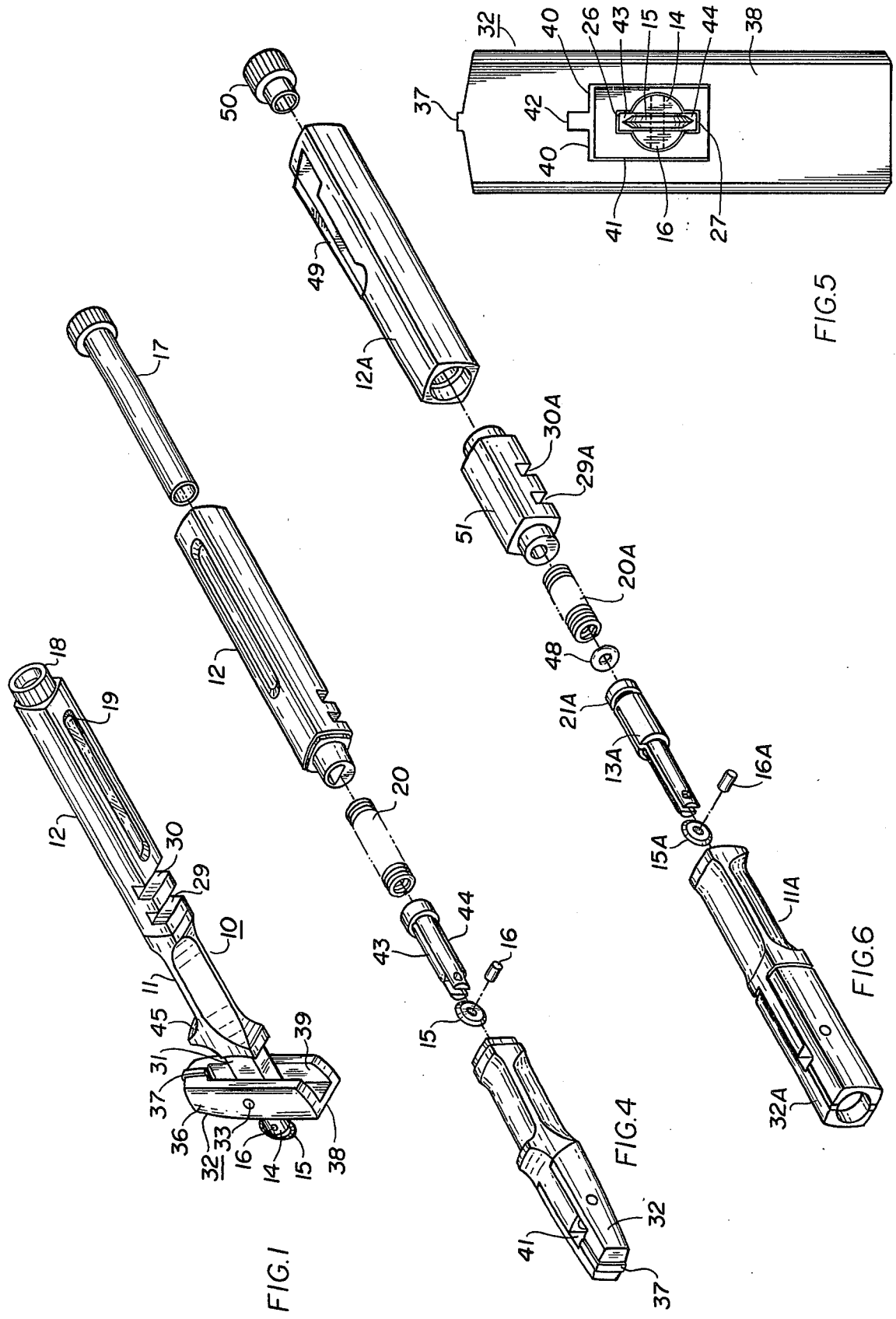

GLASS CUTTER

This invention relates to a glass cutter, and more specifically to a manually operable glass cutting tool.

Glass cutting tools have been known in the art for many years. Generally, such tools comprise a tool handle which has one or more notches formed therein for breaking off narrow pieces of glass after the cut has been made, and a steel cutting wheel rotatably mounted at one end of the handle.

However, there is a need for an improved glass cutter which is capable of providing additional useful features with a small number of piece parts, thus enabling such an improved unit to be manufactured at relatively low cost.

Various prior art patents show or suggest some features which may be added to glass cutting tools (not necessarily tools of the manually operable type), or applied to other types of cutting tools. Generally speaking, however, such features have not been reduced to embodiments which are economical and practicable in conjunction with a hand operable glass cutter.

For example, U.S. Pat. No. 2,314,327 to J. L. Drake discloses a glass cutter having a fixed guide block for guiding the tools along a straight edge in order to make a straight cut. U.S. Pat. No. 2,744,329 to R. C. Way, et al shows a scriber (not a glass cutter) in which the working member is spring-loaded in order to provide constant pressure. U.S. Pat. No. 3,373,488 to A. T. Fletcher teaches the idea of lubricating the cutting wheel of a glass cutter employed in a glass cutting machine, by providing a lubricating liquid through passages in the blade holder. U.S. Pat. No. 3,136,191 to J. G. Madge teaches the concept, in a glass cutting head employed in a glass cutting machine, of using an oil reservoir with means for passing the oil to the cutting blade of a glass cutter. Other patents of general interest are U.S. Pat. Nos. 1,552,546; 2,243,778; and 2,254,413.

Accordingly, an object of the invention is to provide an improved manually operable glass cutter.

Another object of the invention is to provide a glass cutting tool capable of use with the aforementioned glass cutter.

According to one feature of the invention, as herein described there is provided a glass cutter, comprising: an elongated housing, a longitudinally movable cutting wheel supporting member mounted within said housing adjacent one end thereof; a cutting wheel rotatably mounted on said member; a fluid reservoir disposed in said housing; spring means for biasing said supporting member toward said one end of said housing; and valve means disposed within said housing between said reservoir and said wheel for causing fluid within said reservoir to flow to said wheel in response to longitudinal movement of said member toward the other end of said housing.

According to another feature of the invention, as herein described, there is provided a glass cutter comprising an elongated housing, a longitudinally movable cutting wheel supporting member mounted within said housing adjacent one end thereof; a cutting wheel rotatably mounted on said member; spring means for biasing said supporting member toward said one end of said housing; and a cutting wheel cover pivotably mounted to said housing adjacent said one end thereof, said cover having (i) an open position in which a surface of said cover is essentially perpendicular to the plane of said wheel, and (ii) a closed position in which a protective portion of said cover is longitudinally aligned with said housing to protect said wheel.

According to still another feature of the invention, as herein described there is provided a glass cutter comprising an elongated handle, a cutting wheel rotatably mounted adjacennt one end of the handle, and a cover pivotally mounted to said handle adjacent said one end, said cover having (i) an open position in which said cover is usable as a cutting guide, and (ii) a closed position in which said cover protects said wheel.

According to still another feature of the invention, as herein described there is provided a cutting guide, comprising: a base member having (i) a base plate portion with a planar surface part and (ii) a planar guide lip perpendicular to and adjacent said planar surface part; a suction cup rotatably mounted to said base member opposite said planar surface part, said base member having a hole therein oriented in a direction parallel to said planar surface part, an elongated extension having a portion thereof extending into said hole; means for securing said extension to said base member at said hole; and means for securing a cutting tool to a portion of said extension remote from said hole.

The invention will be more clearly understood by reference to the following description of preferred embodiments thereof, taken in conjunction with the accompanying drawings, in which:

FIG. 1 is a perspective view of a glass cutter according to a preferred embodiment of the invention;

FIG. 2 is a side cross-sectional view of the glass cutter of FIG. 1;

FIG. 3 is a top cross sectional view of the nose piece portion of the glass cutter of FIG. 1;

FIG. 4 is an exploded perspective view of the glass cutter of FIG. 1;

FIG. 5 is an end view of the glass cutter of FIG. 1, with the cover thereof in its open or operating position;

FIG. 6 is an exploded perspective view of a glass cutter according to an alternative embodiment of the invention;

FIG. 7 is a perspective view of a glass cutting guide, usable with the glass cutter of the invention, for making straight and circular cuts;

FIG. 8 illustrates the manner in which the glass cutting guide of FIG. 7 may be utilized to cut bottles; and FIG. 9 illustrates the use of the glass cutter of the invention.

As shown in FIG. 1, the glass cutter 10 comprises an elongated housing having a nose piece portion 11 and a reservoir containing portion 12. A longitudinally movable cutting wheel supporting member 13 (not visible in FIG. 1 - see FIG. 2) is mounted within the nose piece portion 11 of the tool housing adjacent the end thereof remote from the reservoir containing portion 12.

The wheel supporting member 13 has a bifurcated end part 14, with a hardened steel cutting wheel 15 rotatably mounted between the bifurcations thereof by means of an axle 16.

A translucent cylindrical fluid reservoir 17 (see FIG. 2) is disposed within the reservoir containing portion 12 of the tool housing. The reservoir 17 has a closed end portion 18 extending from the end of the reservoir containing portion 12, to facilitate removal of the reservoir for refilling purposes. The housing portion 12 has two elongated slots 19 therein to permit view of the reservoir 17 to indicate the amount of liquid remaining therein. The end of the reservoir 17 remote from the closed end 18 thereof is open.

The reservoir 17 is retained within the reservoir-containing portion 12 of the tool housing by a friction fit.

A spring 20 (see FIG. 2) biases the wheel supporting member 13 toward the end of the tool housing at which the cutting wheel is situated.

The end of the supporting member 13 opposite its bifurcated end forms a valve piston 21 (see FIG. 2) which coacts with a shoulder portion 22 of the interior surface of the nose piece 11 to form a fluid control valve.

As more clearly shown in FIG. 2, when the cutting tool 10 is oriented in a generally vertical direction, the cutting oil or other lubricating fluid initially disposed within the reservoir 17 flows through a longitudinal hole 23 into the hollow space 24 within which spring 20 is disposed. A longitudinal channel 25 formed in the interior surface of the nose piece 11 acts as a fluid inlet port for the valve assembly comprising the piston 21 and shoulder 22. The clearance space between the cutting wheel supporting member 13 and the adjacent interior surface of the nose piece 11, as well as oppositely disposed longitudinal channels 26 and 27 (see FIG. 5) formed in said nose piece 11, comprise the outlet port of the valve assembly.

When the cutting tool is held in a generally vertical orientation, and the housing thereof is pressed toward the surface to be cut, so that the cutting wheel 15 and wheel supporting member 13 are displaced toward the opposite end of the housing, the corresponding movement of the piston 21 results in movement of said piston beyond the end 28 of the channel 25, thus permitting fluid to move past the valve assembly to the aforementioned "outlet port," so that said fluid flows to the cutting wheel 15 to lubricate the same. When the tool housing is moved away from the surface to be cut, the action of the spring 20 presses the piston 21 against the valve seat or shoulder 22 to prevent further movement of fluid through the valve assembly.

Thus cutting fluid or lubricant is caused to flow to the cutting wheel 15 only when pressure is applied to said wheel, i.e., when a cut is being made.

Two notches 29 and 30 having different widths are formed in the external surface of the reservoir containing portion 12 of the tool housing. These notches may be utilized, in known manner, to break off narrow strips of glass after a cut has been made.

The nose piece 11 has an end portion 31 of rectangular cross section adjacent the bifurcated end 14 of the wheel supporting member 13. This end portion 31 extends through a hole in a cutting wheel cover 32, said cover being pivotally mounted to said end portion 31 at said hole. The cover 32 and nose piece end portion 31 are pivotally interconnected by means of a pivot 33, which may comprise a separate pivot pin or interlocked pivoting portions of the elements 32 and 31, formed by an Intercasting* operation.

* INTERCAST is a trademark of Gries Reproducer Co., New Rochelle, N.Y.

By the term "Intercasting" is meant a die casting process which can be utilized to form two elements which are interlocked with each other and pivotally movable with respect to each other, by first casing one of the elements and then using a portion of the element first cast as part of the die for casting of the other element. Such a process is described, for example, in U.S. Pat. Nos. 2,768,415 (issued Oct. 30, 1956) and 3,354,249 (issued Nov. 21, 1967).

If the Intercasting technique for forming the elements 32 and 31 is employed, preferably the cover 32 is cast first, with pivot holes 35 (see FIG. 3), and thereafter the nose piece 11 is Intercast therewith so that the protuberances 34 are pivotally interlocked with corresponding holes 35 (see FIG. 3) in said cover.

The cover 32 has a closed end portion 36 which serves to protect the cutting wheel 15 when the cover 32 is in its closed position. A line strike mark, alignment mark or projection 37 on the end portion 36 of the cover 32 serves as a visual indicator of the position of the cutting wheel 15, for purposes of lining up the cut.

The side surfaces of the cover 32 serve as cutting guides. That is, a straight line cut or a cut of a desired shape may be made by moving the cutting tool 10 in such a manner that a side of the cover 32 is constantly in contact with a straight edge ruler or other guiding element. The "bottom" surface 38 of the cover 32 has a slightly convex configuration, but is essentially planar with its plane perpendicular to the plane of the cutting wheel 15. Thus, when the tool 10 is pressed toward a surface to be cut, so that the cutting wheel 15 and supporting member 13 are displaced toward the tool housing, the "bottom" surface 38 of the cover 32 acts as a bottoming means to prevent further inward movement of the cutting wheel 15, and, in cooperation with the biasing action of the spring 20, to insure a constant pressure. Preferably, the force applied to the cutting wheel 15 by the spring 20 when the cutting wheel has its cutting edge disposed adjacent the "bottom" 38 of the cover 32, is on the order of 7-8 pounds. Depending upon the application, however, the cutting force may be established (by suitable selection of the spring 20) in the range of 5-15 lbs.

The relatively long length of the guide cover 32 assures tracking of the cutting wheel parallel to the guide and also helps maintain the plane of the cutting wheel perpendicular to the glass surface to be cut.

Thus, when in its "open" position, the cover 32 acts as a cutting wheel position indicator, as a cutting wheel bottoming means, and as a cutting guide.

The end portion 39 of the cover 32 remote from the end portion 36 thereof, has a U-shaped configuration, so that when the cover 32 is pivoted to its closed position, i.e., with the end portion 36 longitudinally aligned with the housing of the tool, the U-shaped portion 39 surrounds the end portion 31 of the nose piece 11, providing a compact configuration. In this closed position, as seen for example in FIG. 2, the end portion 36 of the cover 32 protects the cutting wheel 15 by preventing contact of said wheel with other objects, and helps resist rusting of the wheel by preventing the lubrication fluid thereon from drying out.

When the cover 32 is moved from its open to its closed position, a detent action is provided by engagement of the shoulder portions (see FIG. 5) of the bottom surface 38 of the cover 32 with the bifurcated ends 14 of the cutting wheel supporting member 13. This engagement results in displacing the wheel supporting member 13 against the action of the spring 20, so that when the cover 32 reaches its closed position the action of the spring 20 urges the supporting member 13 toward the end portions 36 of the cover 32, to provide a detent action which serves to retain the cover 32 in its closed position. That is, after the cover 32 is pivoted to its closed position, pivoting movement of the cover 32 to its open position is resisted by the interference between the angled shoulders 40 (that is, the portions of these shoulders extending between the bottom surface 38 of the cover 32 and the opposite surface thereof) in conjunction with the biasing action of the spring 20.

When the cover is in its open position it is free to move within a wide angle of arc with respect to the body 12/19, thus allowing the operator to position the cutter at an angle to the workpiece which is confortable for his finger grip.

As seen in FIG. 5, in addition to the shoulder portion 40, the hole 41 in the cover 32 has a notch 42 to allow the bottom 38 of the cover 32 to clear the cutting wheel 15 when the cover 32 is pivoted between its open and closed positions. As shown in FIGS. 2, 4 and 5, the cutting wheel support member 13 has two oppositely disposed longitudinal ridges 43 and 44 which extend into the channels 26 and 27 respectively of the nose piece 11 to permit sliding movement of the supporting member 13 with respect to the tool housing, and to prevent rotational movement of the cutting wheel 15 with respect to said housing.

The cutting tool 10 has a thumb grip protuberance 45 formed as an integral portion of the nose piece 11. Preferably, the thumb grip 45 is provided with a roughened or serrated surface to provide an improved grip thereon.

It is preferable, but not necessary, that the protuberances 43 and 44 of the wheel supporting member 13, and the channels 26 and 27 with which they cooperate, be in the same plane as the cutting wheel 15.

As is evident from FIG. 4, only seven piece parts are required for the manufacture of the cutting tool 10, which may be assembled as follows.

The cutting wheel 15 comprises a hardened steel material, having a central hole therein for receiving the axle 16, which is a steel pin. The cutting wheel supporting member 13 is die cast from zinc, with the piston 21 being cast integrally therewith. The nose piece, 11 and cover 32 are Intercast from zinc as previously discussed. The reservoir containing housing portion 12 is also die cast from zinc. The fluid reservoir 17 comprises a suitable translucent plastic such as nylon, Delrin or polypropylene.

The cutting wheel 15 is inserted between the bifurcations 14 of the cutting wheel supporting member 13, and secured in said position with the axle 16. This subassembly is inserted into the Intercast nose piece 11 through the open end 46 thereof. The spring 20 is then inserted into the Intercast nose piece 11 through open end 46 to abut the piston 21 of the wheel supporting member 13.

The reservoir containing housing portion 11 is then inserted into the open end 46 of the Intercast nose piece 11, thus compressing the spring 20 and retaining the sub-assembly comprising wheel 15, axle 16 and supporting member 13 in position. The Intercast nose piece 11 and the reservoir containing housing portion 12 are then swaged together at their juncture, as indicated by the arrows 47 in FIG. 2, to permanently lock the elements 11 and 12 together. The reservoir 17 is then inserted into the open end of the reservoir containing housing portion 12 to complete the assembly.

As previously discussed, when the completed cutting tool 10 is used to cut glass by pressing the housing thereof toward the surface to be cut, the cover 32 provides an alignment mark 37 indicating the position of the cutting wheel, and the sides of the cover 32 serve as guides which may be moved along a straight edge or other guide surface to make a precise cut. The "bottom" 38 of the cover 32 limits the travel of the cutting wheel 15, which is displaced inwardly under the action of the cutting force, so that the spring 20 in cooperation with the bottoming effect due to the "bottom" 38 of the cover 32, provides a constant and accurately controlled cutting pressure. At the same time, the inward movement of the cutting wheel 15 results in opening of the valve (comprising piston 21 and seat 22) to provide cutting or lubricating fluid to flow to the cutting wheel 15. When the cutting tool 10 is not in use, the cover 32 may be rotated (with a detent action as previously discussed) to a closed position, in which it protects the cutting wheel 15 against damage thereto.

An exploded view of an alternative embodiment of the invention is shown in FIG. 6, in which parts having similar functions to those of FIGS. 1–5 have been given the same reference numerals, followed by the letter A. The cutting tool 10A shown in FIG. 6 operates in substantially the same manner as the cutting tool 10 of FIGS. 1–5. However, the following structural differences exist between said tools.

In the tool 10A, a resilient "O" ring seal 48 is provided to fit onto piston 21A located in groove 77, to provide additional protection against leakage of fluid when the tool is not in use.

The reservoir containing portion 12A of the tool housing is made of plastic (such as nylon, Delrin or polycarbonate), and has a fluid reservoir formed integrally therein. Also formed or molded into the reservoir containing portion 12A is a pencil clip 49, for securing the cutter 10A in the pocket of the individual using or carrying the tool. A threaded end cap 50 provides closure of the reservoir within the portion 12A, and may be threadably engaged with the internally threaded end part of the reservoir containing portion 12A.

A separate breaker section 51 is formed of die cast zinc or any other suitable metal, and has breaker notches 29A and 30A therein.

The cutting tool 10A may be assembled in similar fashion to the cutting tool 10, except that the breaker section 51 is joined to the adjacent portions of the elements 11A and 12A by means of a suitable bonding agent such as epoxy glue. Alternatively, these parts may be swaged together in similar fashion to the technique employed to assemble the tool 10.

The cutting guide tool 60 shown in FIGS. 7 and 8 may be utilized to facilitate the making of straight and circular cuts.

As shown in FIG. 7, the tool 60 has a base plate portion 61 with a planar surface 62, a lip having a planar surface adjacent and perpendicular to the surface 62. A rubber suction cup 64 is rotatably mounted to the base plate portion 61. A hole 65 in the base plate portion 61 is oriented in the direction parallel to the planar surface 62. An elongated bar or extension 66 has a portion extending into the hole 65, the extension 66 being secured to the base plate portion 61 at the hole 65 by means of a thumb screw 67.

The free end 68 of the extension 66 is enlarged, and has a hole 69 therein for receiving the cutting tool 10A. A thumb screw 70 secures the cutting tool 10A to the enlarged portion 68 of the extension 66 at the hole 69.

To make a straight cut, the guide tool 60 is disposed at the edge 71 of a glass sheet, the thumb screw 67 is loosened and the extension 66 moved to a position corresponding to the distance between the desired cut and the edge 71, the thumb screw 67 is then tightened, and the tool 61 is moved along the edge 71 with its planar surfaces 62 and 63 in contact with said edge, while the cutting tool 10A is pressed toward the glass surface to be cut. The result is movement of the cutting wheel of the cutter 10A in a direction parallel to the edge 71 at a desired distance therefrom, to produce the desired cut.

When a circular cut is desired, the guide tool 60 is inverted, so that the suction cup 64 may be secured to the surface to be cut. The tool 10A is then secured within the hole 69 by the thumb screw 70, and the extension 66 is rotated about the suction cup 64, while maintaining pressure on the tool 10A, to produce the desired circular cut.

A hole 72 is provided in the lip 63 at one end thereof to permit the cutting of bottles, in the manner illustrated in FIG. 8. A stopper 73 having a pin 74 extending therefrom is placed within the opening of the bottle 75 to be cut. The guide tool 60 is then placed in such a position that the pin 74 extends into the hole 72, and the tool is rotated about the pin 74, while maintaining pressure on the cutter 10A, to produce the desired circular bottle cut, as indicated by the cut line 76.

What is claimed is:

1. A glass cutter, comprising:
   an elongated housing;
   a longitudinally movable cutting wheel supporting member mounted within said housing adjacent one end thereof;
   a cutting wheel rotatably mounted on said member;
   a fluid reservoir disposed within said housing;
   spring means for biasing said supporting member toward said one end of said housing;
   valve means disposed within said housing between said reservoir and said wheel for causing fluid within said reservoir to flow to said wheel in response to longitudinal movement of said member toward the other end of said housing; and
   a cutting wheel cover pivotally mounted to said housing adjacent said one end thereof, said cover having (i) an open position in which a surface of said cover is essentially perpendicular to the plane of said wheel, and (ii) a closed position in which a protective portion of said cover is longitudinally aligned with said housing to protect said wheel.

2. The glass cutter according to claim 1, wherein said reservoir is disposed adjacent the other end of said housing.

3. The glass cutter according to claim 1, further comprising a breaking section integral with said housing, said section having at least one breaking notch therein.

4. The glass cutter according to claim 1, wherein at least a portion of said reservoir is translucent, and said portion is visible from the exterior of said housing to indicate the amount of fluid remaining in said reservoir.

5. The glass cutter according to claim 1, further comprising a cutting wheel cover pivotally mounted to said housing adjacent said one end thereof, said cover having a hole therein adjacent the pivot axis.

6. The glass cutter according to claim 1, wherein said cover has a closed position in which said cutting wheel is disposed entirely within said hole, and a protective portion of said cover is longitudinally aligned with said housing to prevent said wheel from contacting other objects.

7. The glass cutter according to claim 1, wherein said supporting member slidably engages the interior of said housing so that rotation of said member with respect to said housing is precluded.

8. The glass cutter according to claim 7, wherein the portion of the interior of said housing adjacent said cutting wheel supporting member has at least one longitudinal channel therein, and said member has a rotation preventing protuberance extending into said channel.

9. The glass cutter according to claim 8, wherein said interior portion of said housing has two of said channels therein, and said member has two of said protuberances, each protuberance extending into a corresponding channel, said channels being disposed on opposite sides of said member.

10. The glass cutter according to claim 9, wherein said channels are disposed in the plane of said cutting wheel.

11. The glass cutter according to claim 1, wherein said valve means comprises a valve seat consisting of an interior shoulder portion of said housing and a valve piston operatively connected to said cutting wheel supporting member.

12. A glass cutter according to claim 1, further including a cutting guide, said guide comprising:
    a base member having (i) a base plate portion with a planar surface part and (ii) a planar guide lip perpendicular to and adjacent said planar surface part;
    a suction cup rotatably mounted to said base member opposite said planar surface part,
    said base member having a hole therein oriented in a direction parallel to said planar surface part;
    an elongated extension having a portion thereof extending into said base member hole;
    means for securing said extension to said base member at said base member hole; and
    means for securing said housing to a portion of said extension remote from said base member hole.

13. A glass cutter according to claim 12, wherein said lip has a hole therein adjacent an end thereof.

14. A glass cutter, comprising:
    an elongated housing;
    a longitudinally movable cutting wheel supporting member mounted within said housing adjacent one end thereof;
    a cutting wheel rotatably mounted on said member;
    a fluid reservoir disposed in said housing, said reservoir comprising a translucent tubular element and said housing having at least one elongated slot therein adjacent said element, so that at least a portion of said reservoir is visible from the exterior of said housing to indicate the amount of fluid remaining in said reservoir;
    spring means for biasing said supporting member toward said one end of said housing; and
    valve means disposed within said housing between said reservoir and said wheel for causing fluid within said reservoir to flow to said wheel in response to longitudinal movement of said member toward the other end of said housing.

15. The glass cutter according to claim 14, wherein one end of said element is adjacent the other end of said housing, and the other end of said element is open.

16. A glass cutter, comprising:
    an elongated housing;
    a longitudinally movable cutting wheel supporting member mounted within said housing adjacent one end thereof;
    a cutting wheel rotatably mounted on said member;
    a fluid reservoir disposed in said housing;

spring means for biasing said supporting member toward said one end of said housing;

valve means disposed within said housing between said reservoir and said wheel for causing fluid within said reservoir to flow to said wheel in response to longitudinal movement of said member toward the other end of said housing; and a cutting wheel cover pivotally mounted to said housing adjacent said one end thereof, said cover having a hole therein adjacent the pivot axis, said cover having an open position in which said cutting wheel extends through said hole and a surface of said cover adjacent said wheel is essentially perpendicular to the plane of the wheel.

17. The glass cutter according to claim 16, wherein said cover has an alignment mark thereon in the plane of said cutting wheel.

18. The glass cutter according to claim 16, wherein in said open position said supporting member is deflectable a distance such that said wheel may be deflected entirely into said hole when said housing is pressed toward a surface to be cut.

19. A glass cutter, comprising:
an elongated housing;
a longitudinally movable cutting wheel supporting member mounted within said housing adjacent one end thereof;
a cutting wheel rotatably mounted on said member;
spring means for biasing said supporting member toward said one end of said housing; and
a cutting wheel cover pivotally mounted to said housing adjacent said one end thereof, said cover having (i) an open position is which a glass-engaging surface of said cover is essentially perpendicular to the longitudinal axis of said housing and to the plane of said wheel and a guide surface of said cover is perpendicular to the plane of said glass-engaging surface and parallel to the plane of said cutting wheel, and (ii) a closed positioned in which a protective portion of said cover is longitudinally aligned with said housing to protect said wheel, so that said cover acts as a cutting guide in said open position.

20. The glass cutter according to claim 19, wherein said cover has an alignment mark thereon in the plane of said cutting wheel.

21. The glass cutter according to claim 19, wherein in said open position said supporting member is deflectable a distance such that said wheel may be deflected, toward said one end of said housing, entirely beyond said surface when said housing is pressed toward a surface to be cut.

22. A glass cutter, comprising:
an elongated housing;
a longitudinally movable cutting wheel supporting member mounted within said housing adjacent one end thereof;
a cutting wheel rotatably mounted on said member;
a fluid reservoir disposed in said housing;
spring means for biasing said supporting member toward said one end of said housing; and
valve means disposed within said housing between said reservoir and said wheel for causing fluid within said reservoir to flow to said wheel in response to longitudinal movement of said member toward the other end of said housing, said valve means comprising a valve seat consisting of an interior shoulder portion of said housing and a valve piston integral with said cutting wheel supporting member.

23. A glass cutter, comprising:
an elongated housing,
a longitudinally movable cutting wheel supporting member mounted within said housing adjacent one end thereof;
a cutting wheel rotatably mounted on said member;
spring means for biasing said supporting member toward said one end of said housing; and
a cutting wheel cover pivotally mounted to said housing adjacent said one end thereof, said cover having (i) an open position in which a surface of said cover is essentially perpendicular to the plane of said wheel, (ii) a closed position in which a protective portion of said cover is longitudinally aligned with said housing to protect said wheel, and (iii) a part thereof which coacts with the adjacent end of said wheel supporting member to provide a detent action for retaining said cover in said closed position, said wheel supporting member being urged toward said cover by said spring means.

* * * * *